United States Patent
Raney et al.

(10) Patent No.: US 11,212,260 B2
(45) Date of Patent: Dec. 28, 2021

(54) DYNAMIC FIREWALL CONFIGURATION AND CONTROL FOR ACCESSING SERVICES HOSTED IN VIRTUAL NETWORKS

(71) Applicant: Keysight Technologies, Inc., Minneapolis, MN (US)

(72) Inventors: Kristopher Len Raney, Oak Park, CA (US); Winston Wencheng Liu, Woodland Hills, CA (US); Matthew R. Bergeron, Thousand Oaks, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 236 days.

(21) Appl. No.: 15/934,957

(22) Filed: Mar. 24, 2018

(65) Prior Publication Data
US 2019/0297057 A1    Sep. 26, 2019

(51) Int. Cl.
*H04L 29/06* (2006.01)
*H04L 12/24* (2006.01)
*H04L 12/26* (2006.01)

(52) U.S. Cl.
CPC ...... *H04L 63/0263* (2013.01); *H04L 41/0816* (2013.01); *H04L 43/08* (2013.01); *H04L 63/029* (2013.01); *H04L 63/0272* (2013.01); *H04L 63/20* (2013.01)

(58) Field of Classification Search
CPC ... H04L 63/0263; H04L 41/816; H04L 43/08; H04L 63/0272; H04L 63/029; H04L 63/20
See application file for complete search history.

(56) References Cited

U.S. PATENT DOCUMENTS

| | | |
|---|---|---|
| 6,381,218 B1 | 4/2002 | McIntyre et al. |
| 7,340,771 B2 | 3/2008 | Chan et al. |
| 7,594,259 B1 | 9/2009 | Audet et al. |
| 8,065,418 B1 | 11/2011 | Abuan et al. |
| 9,052,941 B1 | 6/2015 | Bone |
| 9,608,906 B2 | 3/2017 | Constantinescu et al. |

(Continued)

FOREIGN PATENT DOCUMENTS

| | | |
|---|---|---|
| EP | 3219087 B1 | 7/2020 |
| GB | 2573673 A | 11/2019 |

(Continued)

OTHER PUBLICATIONS

Notice of Allowance and Fee(s) Due for U.S. Appl. No. 15/374,675 (dated Mar. 18, 2020).

(Continued)

*Primary Examiner* — Lynn D Feild
*Assistant Examiner* — Vladimir I Gavrilenko

(57) ABSTRACT

A method for dynamic firewall configuration for accessing service hosted in virtual networks includes monitoring, in a virtual network, changes in an Internet protocol (IP) address of a service hosted in a virtual network. The method further includes detecting a change the IP address of the service hosted in the virtual network. The method further includes communicating notification of the change in IP address to a firewall policy management interface. The method further includes, automatically configuring a firewall to allow access to the service hosted in the virtual network.

15 Claims, 7 Drawing Sheets

(56) References Cited

U.S. PATENT DOCUMENTS

| | | |
|---|---|---|
| 9,680,877 B2 | 6/2017 | Duffield et al. |
| 9,769,291 B2 | 9/2017 | Nistor et al. |
| 9,814,008 B2 | 11/2017 | Nistor |
| 10,097,442 B2 | 10/2018 | Nistor et al. |
| 10,110,556 B2 | 10/2018 | Nistor |
| 10,681,005 B2 | 6/2020 | Constantinescu et al. |
| 2002/0124189 A1 | 9/2002 | Bakke |
| 2004/0125801 A1 | 7/2004 | Nawata |
| 2004/0139227 A1 | 7/2004 | Takeda |
| 2004/0240468 A1 | 12/2004 | Chin et al. |
| 2004/0255156 A1 | 12/2004 | Chan et al. |
| 2005/0076235 A1 | 4/2005 | Ormazabal et al. |
| 2005/0226194 A1 | 10/2005 | Fan et al. |
| 2006/0062203 A1 | 3/2006 | Satapati |
| 2007/0044156 A1 | 2/2007 | Redmann |
| 2007/0083788 A1 | 4/2007 | Johnson et al. |
| 2007/0213966 A1 | 9/2007 | Noble |
| 2007/0283002 A1 | 12/2007 | Bornhoevd et al. |
| 2008/0072312 A1 | 3/2008 | Takeyoshi et al. |
| 2008/0317020 A1 | 12/2008 | Horne |
| 2009/0040942 A1 | 2/2009 | Yang |
| 2009/0077245 A1 | 3/2009 | Smelyansky et al. |
| 2009/0154363 A1 | 6/2009 | Stephens |
| 2010/0183151 A1 | 7/2010 | Wing et al. |
| 2010/0198960 A1 | 8/2010 | Kirschnick et al. |
| 2011/0010413 A1 | 1/2011 | Christenson et al. |
| 2011/0187864 A1 | 8/2011 | Snider |
| 2011/0231361 A1* | 9/2011 | Patchava ............... G06F 21/577 707/602 |
| 2011/0289440 A1 | 11/2011 | Carter et al. |
| 2012/0054491 A1 | 3/2012 | Tippett |
| 2012/0075439 A1 | 3/2012 | Gong et al. |
| 2012/0078547 A1 | 3/2012 | Murdoch |
| 2012/0311693 A1 | 12/2012 | Horman et al. |
| 2013/0173962 A1 | 7/2013 | Li et al. |
| 2013/0272322 A1 | 10/2013 | Sagarwala et al. |
| 2013/0343388 A1 | 12/2013 | Stroud et al. |
| 2014/0119203 A1 | 5/2014 | Sundaram et al. |
| 2014/0207917 A1* | 7/2014 | Tock ................... H04L 41/0816 709/220 |
| 2014/0280901 A1 | 9/2014 | Blachandran et al. |
| 2014/0310397 A1 | 10/2014 | Tseng et al. |
| 2015/0082417 A1 | 3/2015 | Bhagwat et al. |
| 2015/0113588 A1 | 4/2015 | Wing et al. |
| 2015/0242294 A1 | 8/2015 | Lapierre et al. |
| 2016/0014011 A1 | 1/2016 | Liu et al. |
| 2016/0156541 A1 | 6/2016 | Nistor et al. |
| 2016/0173444 A1 | 6/2016 | Nistor |
| 2016/0174178 A1 | 6/2016 | Nistor |
| 2016/0234113 A1 | 8/2016 | Constantinescu et al. |
| 2016/0234163 A1 | 8/2016 | Nistor et al. |
| 2016/0248795 A1 | 8/2016 | Chien |
| 2017/0097841 A1 | 4/2017 | Chang et al. |
| 2018/0124150 A1 | 5/2018 | Myron et al. |
| 2018/0167285 A1 | 6/2018 | Constantinescu et al. |
| 2018/0338346 A1* | 11/2018 | Routt .................... H04L 43/045 |
| 2019/0034254 A1* | 1/2019 | Nataraj ................. G06F 11/079 |
| 2019/0036963 A1* | 1/2019 | Ahad ................... H04L 63/1416 |
| 2019/0182213 A1* | 6/2019 | Saavedra ............ H04L 63/0218 |

FOREIGN PATENT DOCUMENTS

| | | |
|---|---|---|
| WO | WO 03/069493 A1 | 8/2003 |
| WO | WO 2016/130280 A1 | 8/2016 |
| WO | WO 2018/106304 | 6/2018 |

OTHER PUBLICATIONS

Communication under Rule 71 (3) EPC Intention to Grant for European Patent Application Serial No. 16 749 568.8 (dated Feb. 20, 2020).

Non-Final Office Action for U.S. Appl. No. 15/374,675 (dated Dec. 5, 2018).

Non-Final Office Action for U.S. Appl. No. 15/374,675 (dated Oct. 4, 2019).

Office Action for Great Britain Patent Application Serial No. GB1903696.1 (dated Sep. 18, 2019).

Notice of Allowance and Fee(s) Due and Examiner-Initiated Interview Summary for U.S. Appl. No. 14/574,359 (dated Jun. 13, 2018).

Extended European Search Report for European Application No. 16749568.8 (dated Jun. 8, 2018).

Final Office Action for U.S. Appl. No. 14/557,418 (dated May 3, 2018).

Notification of Transmittal of the International Search Report and the Written Opinion of the International Searching Authority, or the Declaration for International Application No. PCT/US2017/051357 (dated Dec. 15, 2017).

Non-Final Office Action for U.S. Appl. No. 14/574,359 (dated Nov. 16, 2017).

Advisory Action and AFCP 2.0 Decision for U.S. Appl. No. 14/574,359 (dated Oct. 16, 2017).

Supplemental Notice of Allowability for U.S. Appl. No. 14/572,746 (dated Oct. 5, 2017).

Non-Final Office Action for U.S. Appl. No. 14/557,418 (dated Sep. 27, 2017).

Communication of European publication number and information on the application of Article 67(3) EPC for European Patent Application No. 16749568.8 (dated Aug. 23, 2017).

Final Office Action for U.S. Appl. No. 14/574,359 (dated Jul. 27, 2017).

Notice of Allowance and Fee(s) Due for U.S. Appl. No. 14/572,746 (dated Jul. 11, 2017).

Applicant Initiated Interview Summary for U.S. Appl. No. 14/572,746 (dated Jun. 22, 2017).

Notice of Allowance and Fee(s) Due for U.S. Appl. No. 14/619,041 (dated May 9, 2017).

Non-Final Office Action for U.S. Appl. No. 14/572,746 (dated Mar. 7, 2017).

Non-Final Office Action for U.S. Appl. No. 14/574,359 (dated Jan. 17, 2017).

Non-Final Office Action for U.S. Appl. No. 14/619,041 (dated Dec. 16, 2016).

Notice of Allowance and Fee(s) Due for U.S. Appl. No. 14/619,039 (dated Nov. 7, 2016).

Non-Final Office Action for U.S. Appl. No. 14/572,746 (dated Aug. 24, 2016).

Non-Final Office Action for U.S. Appl. No. 14/619,039 (dated Jul. 13, 2016).

Notification of Transmittal of the International Search Report and the Written Opinion of the International Searching Authority, or the Declaration for International Application No. PCT/US2016/013827 (dated May 2, 2016).

Commonly-Assigned, co-pending U.S. Appl. No. 14/619,039 for "Methods, Systems, and Computer Readable Media for Identifying Network Locations Associated with Endpoints," (Unpublished, filed Feb. 10, 2015).

Commonly-Assigned, co-pending U.S. Appl. No. 14/619,041 for "Methods, Systems, and Computer Readable Media for Facilitating the Resolving of Endpoint Hostnames in Test Environments with Firewalls, Network Address Translators (NATs), or Clouds," (Unpublished, filed Feb. 10, 2015).

Commonly-Assigned, co-pending U.S. Appl. No. 14/574,359 for "Methods, Systems, and Computer Readable Media for Initiating and Executing Performance Tests of a Private Network and/or Components Thereof," (Unpublished, filed Dec. 17, 2014).

Commonly-Assigned, co-pending U.S. Appl. No. 14/572,746 for "Methods, Systems, and Computer Readable Media for Receiving a Clock Synchronization Message," (Unpublished, filed Dec. 16, 2014).

Commonly-Assigned, co-pending U.S. Appl. No. 14/557,418 for "Methods, Systems, and Computer Readable Media for Receiving Test Configuration Information," (Unpublished, filed Dec. 1, 2014).

"UDP hole punching," Wikipedia, http://en.wikipedia.org/wiki/UDP_hole_punching, (Nov. 25, 2014).

Marius Pavel Nistor, "Application Mixes Add New Levels of Realism to IxChariot 8 Network Testing," Ixia, (Aug. 1, 2014).

(56) References Cited

OTHER PUBLICATIONS

Vixie et al., "Dynamic Updates in the Domain Name System (DNS Update)," RFC 2136, pp. 1-26 (Apr. 1997).
Notice of Allowance and Fee(s) Due, Examiner-Initiated Interview Summary, and AFCP 2.0 Decision for U.S. Appl. No. 14/557,418 (dated Jul. 24, 2018).
Notification of Grant for Great Britain Application Serial No. 1903696.1 (dated Jun. 16, 2020).
Intention to Grant under Section 18(4) for Great Britain Patent Application Serial No. 1903696.1 (dated May 15, 2020).
"NAT Port Mapping Protocol," Wikipedia, https://en.wikipedia.org/wiki/NAT_Port_Mapping_Protocol, pp. 1-2, (Sep. 10, 2017).
Advisory Action, Examiner-Initiated Interview Summary, and AFCP 2.0 Decision for U.S. Appl. No. 15/374,675 (dated Sep. 3, 2019).
Final Office Action for U.S. Appl. No. 15/374,675 (dated Jun. 13, 2019).
Decision to grant a European patent pursuant to Article 97(1) EPC for European Application Serial No. 16749568.8 (dated Jun. 12, 2020).

* cited by examiner

| CLIENT ID | CLIENT IP | CLIENT PORT | HOST IP | HOST PORT | PINHOLE DURATION | MAX INGRESS/EGRESS PACKET COUNT | MAX INGRESS/EGRESS DATA QUOTA |
|---|---|---|---|---|---|---|---|
| CLIENT 1 | IP ADD X | PORT Y | IP ADD Z | PORT ZZ | 2MIN 30SEC | 10,000 | 1 Gb |
| | | | | | | | |
| | | | | | | | |

FIG. 6

DYNAMIC FIREWALL CONFIGURATION AND CONTROL FOR ACCESSING SERVICES HOSTED IN VIRTUAL NETWORKS

TECHNICAL FIELD

The subject matter described herein relates to providing access to services hosted in virtual networks. More particularly, the subject matter described herein relates to dynamic firewall configuration and control for services hosted in virtual networks.

BACKGROUND

Network services are often hosted in virtual networks. For example, enterprise organizations may move some or all of the services required to conduct their businesses to virtual networks, such as cloud networks, where the interfaces to computing hardware are virtualized. Virtual network service providers maintain the underlying hardware and ensure the proper operation of hosted services running on the hardware. Part of ensuring the proper operation of hosted services can include moving services between or among hardware platforms for load balancing, failover, or other operational reasons. Moving hosted services among hardware platforms can lead to accessibility problems, especially when hosted services are accessed through firewalls.

Firewalls are used to monitor and police traffic entering and leaving networks. One problem with accessing services hosted in a virtual network environment when the services move between platforms is that IP addresses of services change, and firewalls that control access to hosted services must be configured to allow traffic to and from the hosted service. If a firewall is programmed to deny all traffic except for traffic that is specifically authorized by a firewall rule, the firewall must be configured to allow traffic from a client to the hosted service and from the hosted service to the client. If the IP address of the hosted service changes frequently, the firewall must be frequently reconfigured to allow such access.

Reconfiguring a firewall in some cases involves contacting the information technology (IT) department of an organization and having an individual manually configure the firewall to allow the desired traffic. Such manual configuration is labor intensive and unsuitable for dynamically changing network environments where the IP address used to access a hosted service is transient. Accordingly, there exists the need for improved methods and systems for firewall configuration and control for accessing services hosted in virtual networks.

SUMMARY

A method for dynamic firewall configuration for accessing services hosted in virtual networks includes monitoring, in a virtual network, changes in an Internet protocol (IP) address of a service hosted in a virtual network. The method further includes detecting a change the IP address of the service hosted in the virtual network. The method further includes communicating notification of the change in the IP address to a firewall policy management interface. The method further includes, automatically configuring a firewall to allow access to the service hosted in the virtual network.

A system for dynamic firewall configuration for accessing services hosted in virtual networks includes a hosted service metadata collector for monitoring, in a virtual network, changes in an internet protocol (IP) address of a service hosted in the virtual network, detecting a change in the IP address of the service hosted in the virtual network, and communicating notification of the change in the IP address. The system further includes a firewall policy management interface for receiving the notification of the change in IP address and automatically configuring the firewall to allow traffic to and from the service hosted in virtual network.

According to one aspect of the subject matter described herein, the hosted service metadata collector collects metadata for a plurality of different services hosted in the virtual network, wherein the hosted service metadata includes mappings between hosted service identifiers and network addresses associated with the hosted services.

According to another aspect of the subject matter described herein, a visibility agent associated with the hosted service that automatically communicates changes in the IP address of the hosted service to the hosted service metadata collector.

According to another aspect of the subject matter described herein, the hosted service metadata collector is configured to monitor domain name system (DNS) records for the service hosted in the virtual network.

According to another aspect of the subject matter described herein, the hosted service metadata collector is configured to monitor service logs of the virtual network.

According to another aspect of the subject matter described herein, the hosted service metadata collector is configured to communicate the notification of the change in the IP address in response to a subscription previously received from the firewall policy management interface.

According to another aspect of the subject matter described herein, the hosted service metadata collector is configured to communicate notification of the change in the IP address to the firewall policy management interface without requiring prior communication from the firewall policy management interface.

According to another aspect of the subject matter described herein, the firewall policy management interface is configured to monitor session traffic associated with the hosted service an automatically configuring the firewall based on utilization of the hosted service.

According to another aspect of the subject matter described herein, the virtual network comprises a cloud network.

The subject matter described herein for dynamic firewall configuration for accessing services hosted in virtual networks may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 6 is a table illustrating an exemplary firewall control rule that may be maintained by a firewall rule control and configuration system.

DETAILED DESCRIPTION

Figure 1:
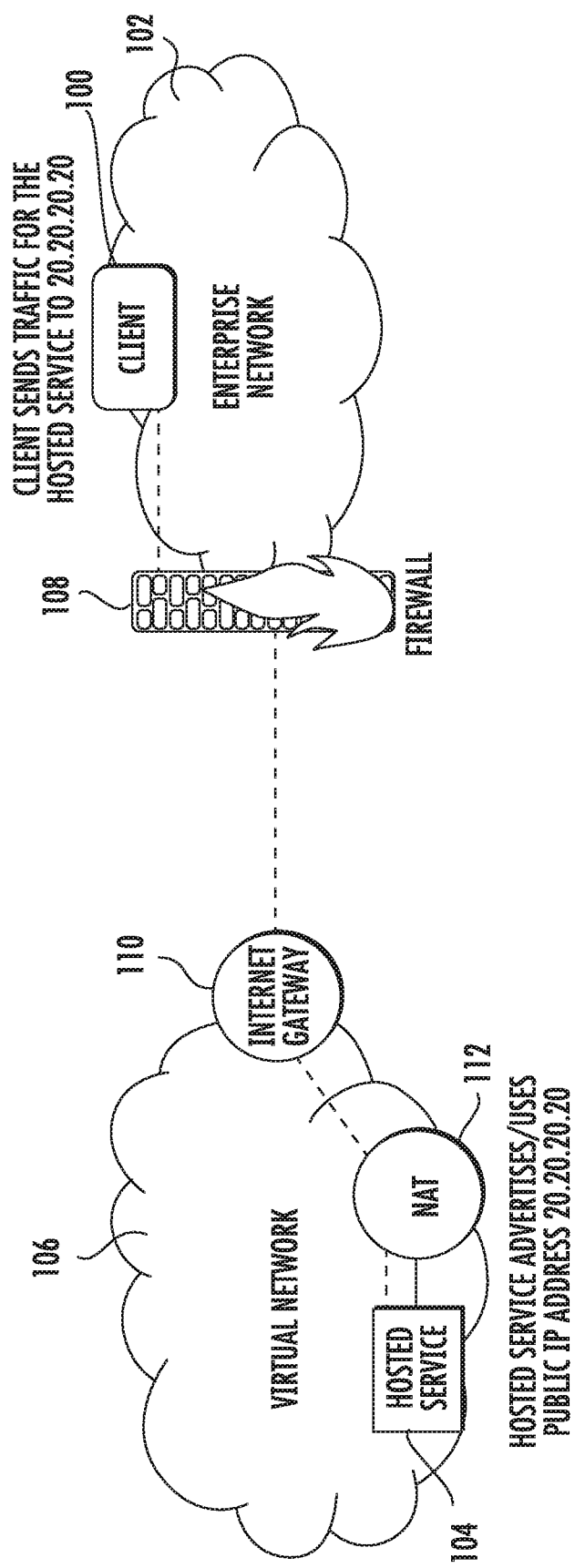
FIG. 1 is a network diagram illustrating a client accessing a service hosted in a virtual network.

The subject matter described herein includes methods and systems for dynamic firewall configuration and control for accessing services hosted in virtual networks. FIG. 1 illustrates an example of accessing services hosted in a virtual network through a firewall. In FIG. 1, a client 100 located in an enterprise network 102 seeks access to a service 104 hosted in a virtual network 106. Client 100 may be a user terminal or other computing platform through which computing services are accessed. Enterprise network 102 may be an on premise network of an organization or a virtual network, such as a public or private cloud network, where an organization runs all or part of its services. Virtual network 106 may be a separate on premise network, a public cloud network or a private cloud network that hosts at least some services hosted that are accessed by enterprise network 102.

A firewall 108 controls access to traffic to and from enterprise network 102. Firewall 108 may be any device or a collection of devices that monitors and controls traffic flow to or from a network. The term "firewall" is intended to include security groups that control access to cloud networks. An Internet gateway 110 provides an interface between virtual network 106 and the Internet. A network address translator (NAT) 112 translates IP addresses from private to public addresses and vice versa to protect private IP addresses in virtual network 106.

In the illustrated example, NAT 112 advertises the public IP address 20.20.20.20 for accessing hosted service 104. The public IP address of hosted service 104 may be propagated through domain name system (DNS) servers so that the service can be accessed using a host name. Once client 100 or the DNS servers in network 102 learn of the IP address of hosted service 104, the network administrator of network 102 must manually configure firewall 108 to allow traffic to and from public IP address 20.20.20.20. The configuration may be performed manually by an IT administrator adding a rule to the firewall to allow traffic to and from the IP address. Once a firewall 108 is configured to allow the traffic, client 100 can access the hosted service using the IP address 20.20.20.20 or a host name that DNS translates to 20.20.20.20.

Figure 2:
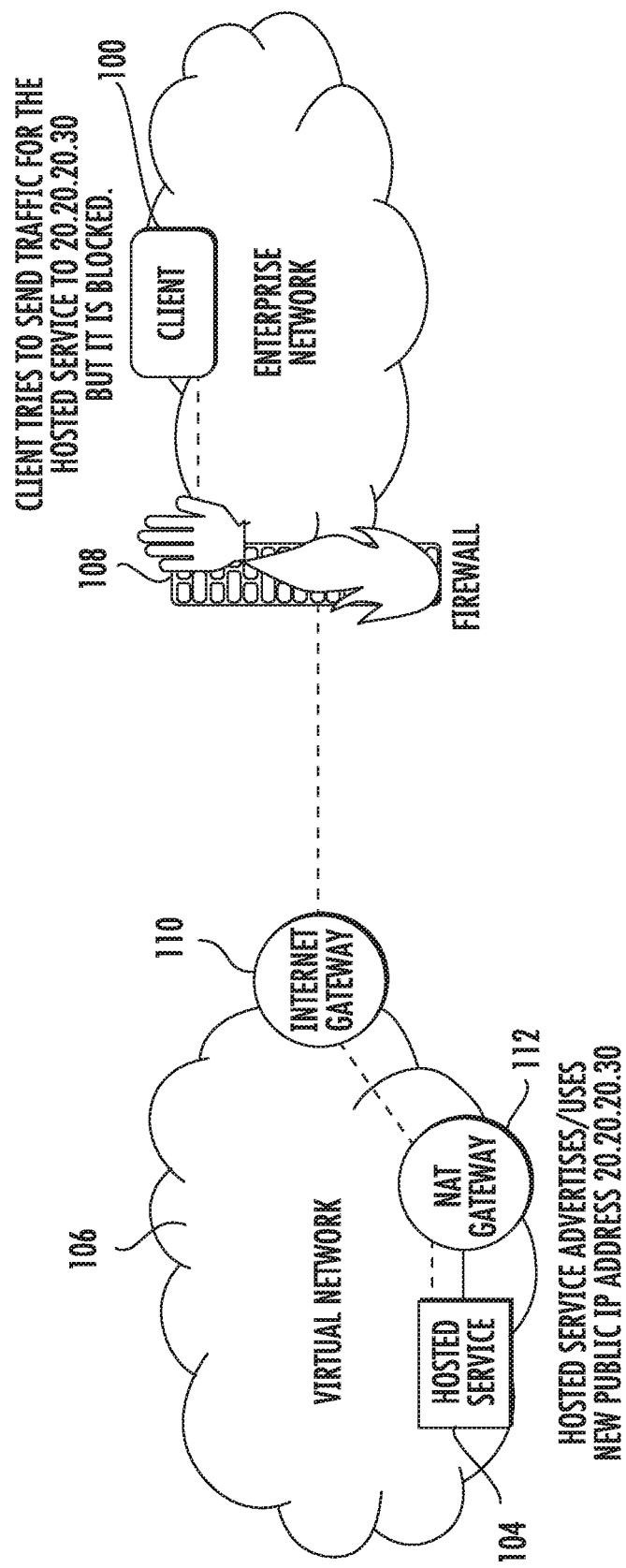
FIG. 2 is a network diagram illustrating a client being prevented from accessing a service hosted in a virtual network when the IP address of the service changes.

In FIG. 2, the IP address of hosted service 104 changes to 20.20.20.30. Client 100 and/or the DNS servers in network 102 learn of the change in IP address through normal propagation of DNS updates among DNS servers. However, firewall 108 may be unaware of this change. Accordingly, client 100 tries to send traffic to hosted service 104 using the IP address 20.20.20.30 but the traffic is blocked by firewall 108 because firewall 108 has not been configured with a rule to allow traffic to the new IP address for hosted service 104. Similarly, hosted service 104 may try to send traffic to client 100, but the traffic may be blocked by firewall 108 because firewall 108 is not configured to allow traffic from the new IP address for hosted service 104. Thus, once a change in IP address of a hosted service occurs, firewall 108 must be manually reconfigured to all traffic to and from the new IP address. Such a manual and labor intensive process is not suitable for accessing services hosted in virtual networks where the IP address associated with the service is transient.

Figure 3:
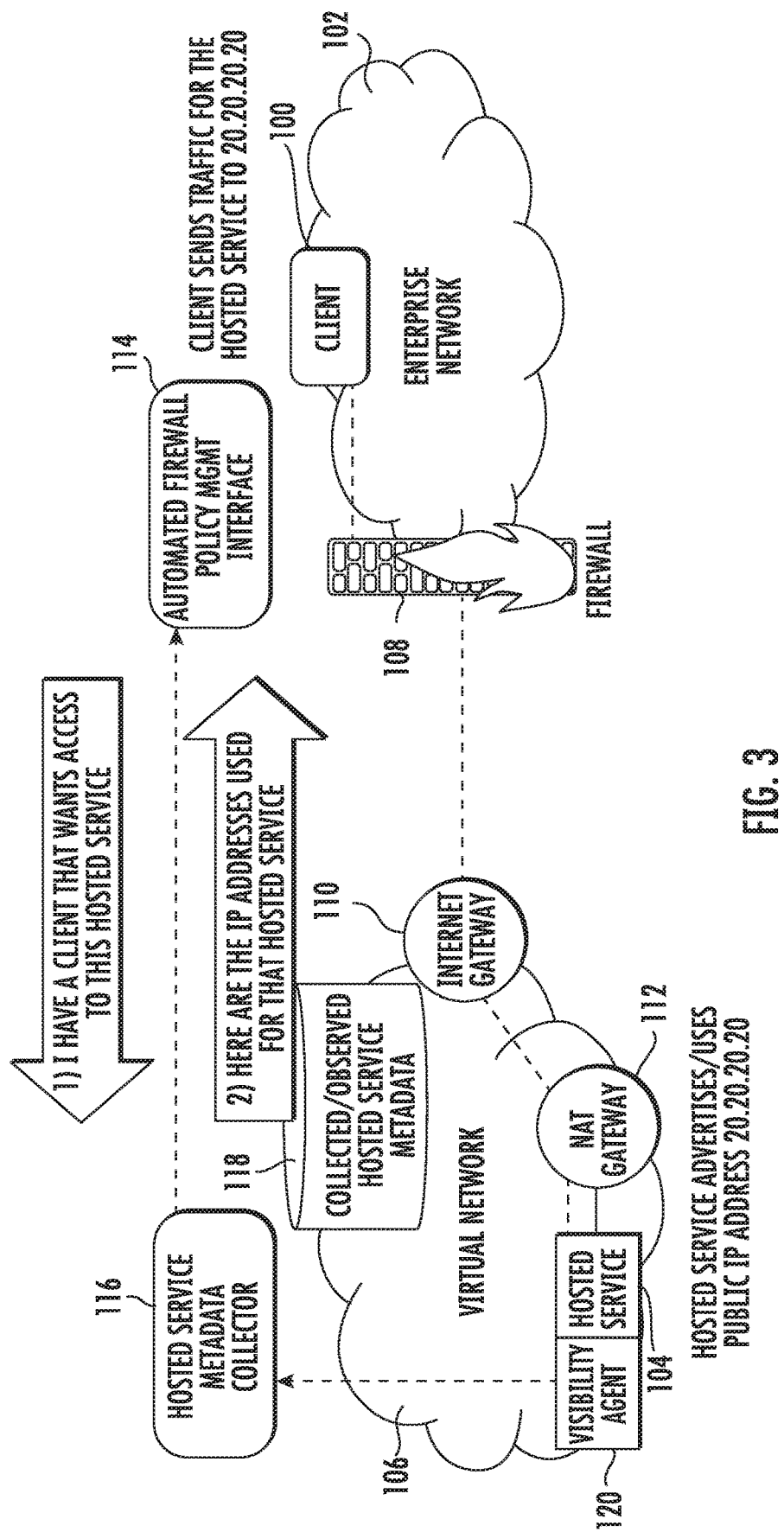
FIG. 3 is a network diagram illustrating a system for automatically configuring a firewall to allow access to a service hosted in a virtual network where the firewall requests and is automatically configured with an initial IP address of a service.

FIG. 3 is a network diagram illustrating automatic firewall configuration for access to services hosted in a virtual network. In FIG. 3, firewall 108 includes an automated firewall policy management interface 114 that requests or subscribes with a hosted service metadata collector 116 operating in virtual network 106 to be informed of IP addresses used by a hosted service. It is understood that enterprise network 102 may include a computing platform having at least one processor on which automated firewall policy management interface 114 executes. The computing platform on which automated firewall policy management interface 114 executes may be the same platform on which firewall 108 executes or a computing platform that is separate from the platform on which firewall 108 executes. It is also understood that virtual network 106 may include a computing platform having at least one processor on which hosted service metadata collector 116 executes.

In the illustrated example, automated firewall policy management interface 114 transmits a message to hosted service metadata collector 116 indicating that a client in network 102 needs access to a hosted service. The message may identify the hosted service by domain name or other suitable identifier. The message, in one example, may be a subscription request through which automated firewall policy management interface 114 subscribes to receive the current IP address of a hosted service and to automatically receive updates when the IP address of the hosted service changes.

Hosted service metadata collector 116 responds with the IP address or addresses used by the hosted service. Hosted service metadata collector 116 may maintain a database 118 of hosted service metadata that is obtained from virtual network 106. The hosted service metadata may include service names or identifiers and IP addresses associated with each hosted service. Hosted service metadata collector 116 may obtain the hosted service metadata from visibility agents 120 that are associated with each hosted service. In an alternate implementation, hosted service metadata collector 116 may scan DNS records for names and IP addresses of hosted services. In yet another example, hosted service metadata collector 116 may obtain hosted service metadata from service logs associated with virtual network 106.

Figure 4:
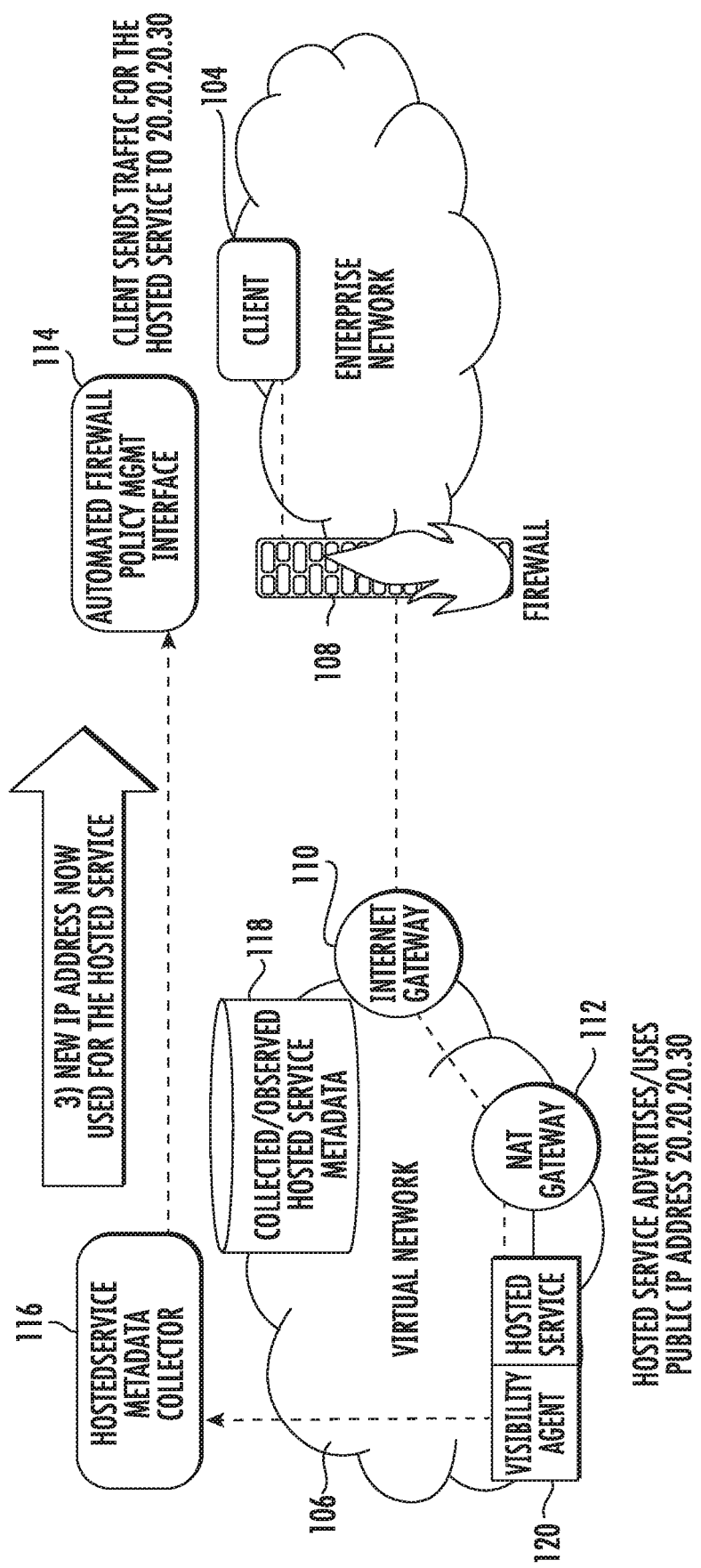
FIG. 4 is a network diagram illustrating the automatic configuration of a firewall when the IP address associated with a hosted service changes.

FIG. 4 illustrates an example of the network illustrated in FIG. 3 where the IP address associated with hosted service 104 changes. In the illustrated example, the IP address of hosted service 104 changes to 20.20.20.30. Because automated firewall policy management interface 114 previously subscribed with hosted service metadata collector 116 to be informed of changes in IP addresses for the hosted service, hosted service metadata collector 116 automatically publishes new IP addresses used for the hosted service to subscribers, such as firewall policy management interface 114. Thus, in one example, hosted service metadata collector 116 may implement a publish-subscribe interface where interested firewalls, firewall configuration interfaces, or other entities subscribe to receive changes in IP address associated with a hosted service, and hosted service metadata collector 116 publishes changes in the IP address of hosted services to authorized subscribers. Once automated firewall policy management interface 114 receives the new IP address, automated firewall policy management interface 114 automatically configures firewall 108 to allow traffic to and from the new IP address associated with the hosted service, thus eliminating the blocking of traffic to and from the hosted service and the need for manual reconfiguration of firewall rules when the IP address of a hosted service changes.

Figure 5:
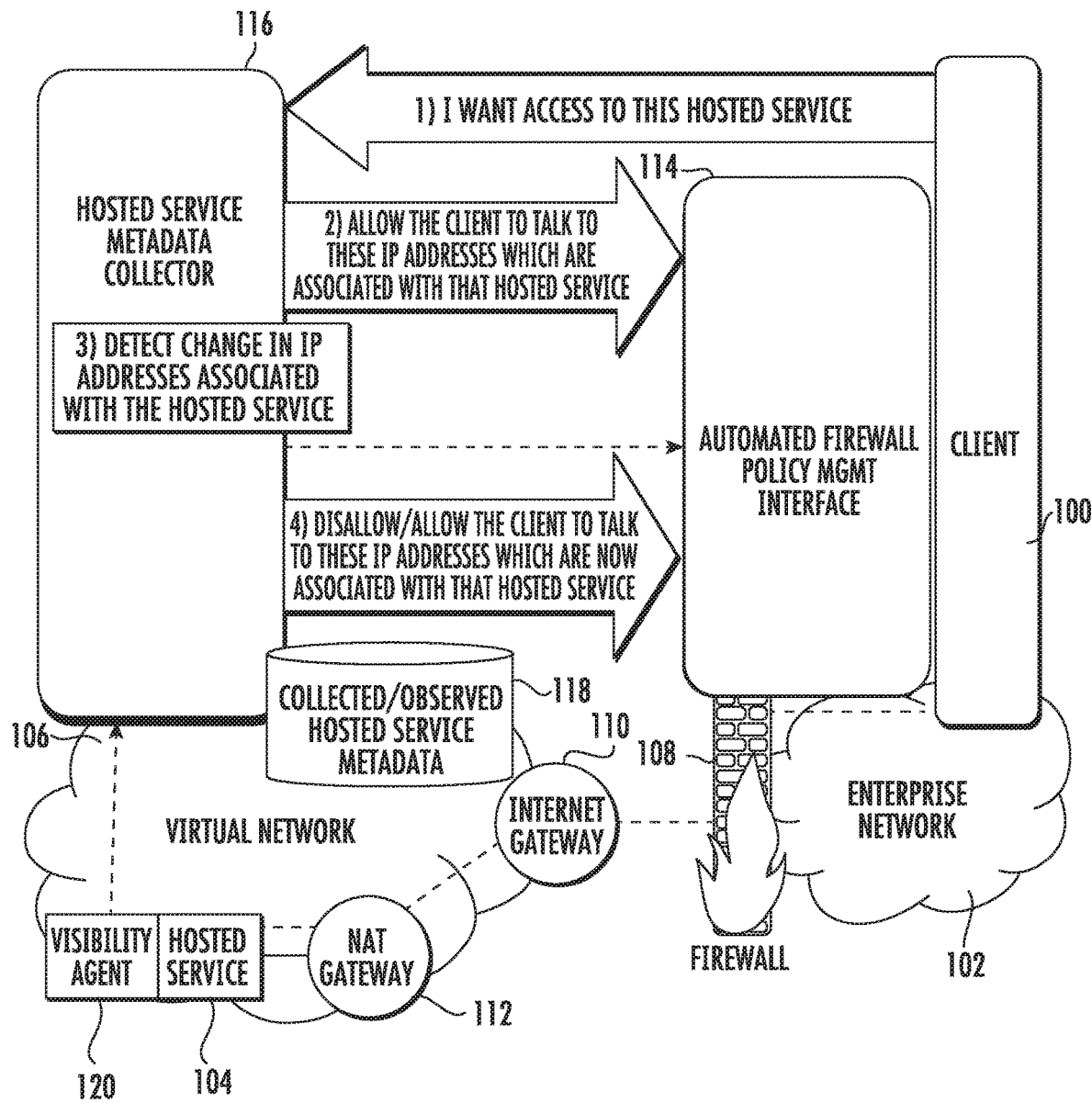
FIG. 5 is a diagram illustrating the automatic communication of hosted service IP addresses to a firewall without requiring the firewall to subscribe to receive notifications of changes in IP address of a hosted service.

In FIGS. 3 and 4, firewall policy management interface 114 initiates the request to obtain IP address information associated with a hosted service. In an alternate implementation, client 100 may generate and send the subscription request for interface 114 to be informed of changes in IP address of a hosted service. Alternatively, hosted service metadata collector 116 may automatically communicate the changes in IP address of a hosted service to firewall policy management interface 114 to without requiring firewall 108 or firewall policy management interface 114 to send a subscription request. FIG. 5 illustrates an example where firewall 108 and firewall policy management interface 114 are not required to initiate the request to be notified of changes in IP address of a hosted service. In FIG. 5, in step 1, client 100 transmits a message to virtual network 106 indicating desire to access a service hosted in virtual network 106. Hosted service metadata collector 116, in response to the message, subscribes firewall policy management interface 114 to automatically receive notifications of changes in IP address of the hosted service identified in the message.

In an alternate implementation, hosted service metadata collector 116 may be configured by the service provider of virtual network 106 to automatically notify certain parties of changes in IP address of hosted services. For example, when an end user places a hosted service in virtual network 106, the operator of virtual network 106 may configure hosted service metadata collector 116 to notify a firewall policy management interface in the end user's network of changes in IP address of the hosted service. Once hosted service metadata collector 116 is configured or notified that address information associated with the hosted service is needed, in step 2, hosted service metadata collector 116 transmits a rule or at least IP address information to firewall 108 for automatically configuring firewall 108 to allow traffic to and from the hosted service. Automated firewall policy management interface 114, in response to receiving the address information, automatically configures firewall 108 to allow traffic to or from the hosted service associated with the IP address.

In step 3 in FIG. 5, hosted service metadata collector 116 detects a change in IP address associated with the hosted service from a visibility agent 120 that is associated with hosted service 104. Visibility agent 120 may be configured to automatically notify hosted service metadata collector 116 of changes in the IP address of hosted service 104. In an alternate implementation, hosted service metadata collector 116 may scan DNS records or service logs of network 106 to detect changes in IP address of hosted service 104. In response to detecting the change in IP address of hosted service 104, in step 4, hosted service metadata collector 116 sends a message to automated firewall policy management interface 114 to indicate new IP addresses associated with the hosted service and to disallow the old IP addresses associated with the hosted service. Automated firewall policy management interface 114 automatically configures firewall 108 to allow access to the hosted service through the new IP address. Automated firewall policy management interface 114 may also delete the firewall policy rule that allowed access to the hosted service through the former IP address used by the hosted service.

According to another aspect of the subject matter described herein, hosted service metadata collector 116 may maintain records associated with hosted services and use data in the records to determine whether or not to trigger a change in a corresponding firewall rule. For example, hosted service metadata collector 116 may monitor traffic volume associated with a session involving a hosted service, the time that the firewall pinhole has been open, or other metrics of utilization of a particular hosted service. The term "pinhole" refers to a firewall rule that allows traffic to flow through the firewall when other traffic is blocked. In the context of hosted services, a firewall pinhole is a rule that allows traffic to and from the IP address currently used by a hosted service and to and from a particular client on the protected side of the firewall. If the traffic volume or duration of time that a pinhole is open exceeds a threshold, hosted service metadata collector 116 may transmit a message to automated firewall policy management interface 114 to indicate that the firewall rule that allows access to the hosted service should be changed or deleted.

FIG. 6 is a table illustrating exemplary data that may be stored by hosted service metadata collector 116 to monitor utilization of firewall pinholes and hosted services. In the illustrated example, a particular client, client 1, has an IP address x and a port y. Client 1 accesses a hosted service at IP address z and port zz. The associated pinhole in firewall 108 has a pinhole duration of 2 minutes and 30 seconds, a maximum packet count of 10,000, and a maximum data quota of 1 gigabyte. Hosted service metadata collector 116 may monitor traffic associated with a hosted service to a particular client, compare the utilization to the data stored in the rule table in FIG. 6 and instruct firewall 108 to modify or change the firewall policy in response to a threshold being exceeded.

Figure 7:
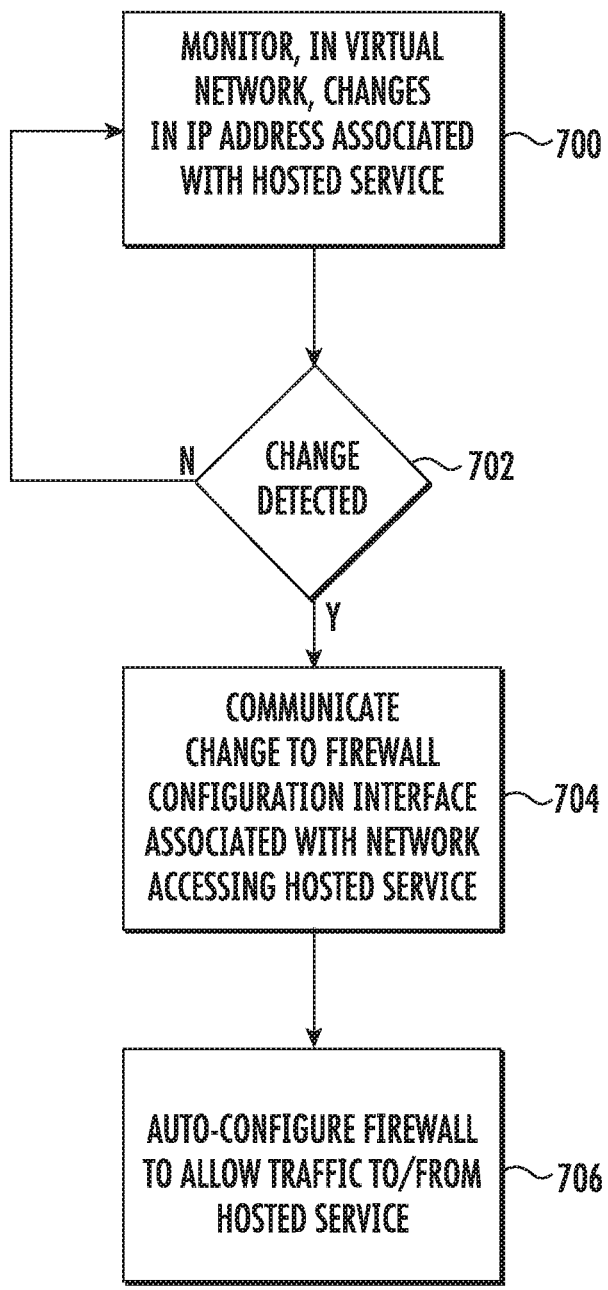
FIG. 7 is a flow chart illustrating an exemplary process for automatic firewall configuration and control for accessing services hosted in virtual networks.

FIG. 7 is a flow chart illustrating an exemplary process for automatically configuring and controlling a firewall that provides access to a service hosted in a virtual network. Referring to FIG. 7, in step 700, a virtual network is monitored for changes in IP address associated with the hosted service. For example, hosted service metadata collector 116 may obtain information associated with changes in IP address of a hosted service from visibility agent 120, from DNS, or from the service logs of virtual network 106. In step 702, it is determined whether a change in IP address of a hosted service is detected. If no change is detected, monitoring continues without sending firewall reconfiguration rules.

If a change in IP address of a hosted service is detected in step 702, control proceeds to step 704 where the change in address is communicated to a firewall configuration interface associated with a network that is or desires to access the service. For example, hosted service metadata collector 116 may notify automated firewall policy management interface 114 of the change in IP address associated with a hosted service. As described above, automated firewall policy management interface may subscribe to receive updates in IP address associated with hosted services. Alternatively, hosted service metadata collector 116 may be configured to provide the IP address information without requiring firewall 108 or its associated policy management interface to subscribe to receive the updates.

In step 706, the firewall is automatically configured to allow traffic to or from the hosted service. This step may be performed automatically by automated firewall policy management interface 114 when an IP address associated with a hosted service changes. Automatically configuring the firewall may include adding a rule, modifying an existing rule, and/or deleting a rule when IP address associated with a hosted service changes.

Thus, by providing visibility agents and a hosted service metadata collector to monitor changes in IP address of hosted services and automatically communicating notification of the changes in IP address of the hosted services to firewall policy management interfaces, the subject matter described herein improves computer networking and security technology by decreasing the time and labor required to access a hosted service when its IP address changes. The need for manual firewall reconfiguration by the IT department in an organization is reduced by providing a firewall policy management interface that subscribes to receive notification of changes in IP address of a hosted service, automatically receives notification of the changes in IP address, and automatically reconfigures the firewall to allow traffic to and from the hosted service in response to receiving the notification of change in IP address.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for dynamic firewall configuration for accessing services hosted in virtual networks, the method comprising:
   receiving, at a hosted service metadata collector and from an automated firewall policy management interface, a subscription request message through which the automated firewall policy management interface subscribes to receive a current Internet protocol (IP) address of a service hosted in a virtual network separate from an enterprise network protected by a firewall and to automatically receive updates when the IP address of the service hosted in the virtual network changes;
   monitoring, using a visibility agent separate from the firewall and co-located with the service hosted in the virtual network separate from the enterprise network protected by the firewall, changes in the IP address of the service hosted in the virtual network, wherein the service hosted in the virtual network comprises a service hosted on a computing platform in the virtual network and that provides service to clients located behind the firewall in the enterprise network;
   detecting, by the visibility agent, a change in the IP address of the service hosted in the virtual network when the service hosted in the virtual network moves from the computing platform to a different computing platform in the virtual network for load balancing, failover, or other operational reasons of the virtual network;
   communicating, from the visibility agent to the hosted service metadata collector, notification of the change in the IP address and communicating, pursuant to a subscription created by the subscription request message, notification of the change in the IP address from the hosted service metadata collector to the firewall policy management interface; and
   automatically configuring, by the firewall policy management interface and responsive to receiving the notification of the change in the IP address, the firewall to allow egress traffic from the enterprise network to the service and ingress traffic from the service into the enterprise network.

2. The method of claim 1 wherein the hosted service metadata collector that collects hosted service metadata for a plurality of different services hosted in the virtual network.

3. The method of claim 2 wherein the hosted service metadata includes mappings between hosted service identifiers and network addresses associated with the hosted services.

4. The method of claim 1 wherein the visibility agent associated with the hosted service automatically communicates notifications of changes in the IP address of the hosted service to the hosted service metadata collector located in the virtual network and the hosted service metadata collector automatically communicates the notifications of the changes in the IP address to the firewall policy management interface pursuant to the subscription.

5. The method of claim 1 wherein monitoring changes in the IP address of the service hosted in the virtual network includes monitoring domain name system (DNS) records for the service hosted in the virtual network.

6. The method of claim 1 wherein monitoring changes in the IP address of the service hosted in the virtual network includes monitoring service logs of the virtual network.

7. The method of claim 1 comprising monitoring session traffic associated with the hosted service an automatically configuring the firewall based on utilization of the hosted service.

8. The method of claim 1 wherein the virtual network comprises a cloud network.

9. A system for dynamic firewall configuration for accessing services hosted in virtual networks, the system comprising:
   a hosted service metadata collector for receiving, from an automated firewall policy management interface, a subscription request message through which the automated firewall policy management interface subscribes to receive a current Internet protocol (IP) address of a service hosted in a virtual network separate from an enterprise network protected by a firewall and to automatically receive updates when the IP address of the service hosted in the virtual network changes;
   a visibility agent separate from the firewall and co-located with the service hosted in the virtual network separate from the enterprise network protected by the firewall, wherein the service hosted in the virtual network comprises a service hosted on a computing platform in the virtual network and that provides service to clients located behind the firewall in the enterprise network, the visibility agent being further configured for monitoring changes in the IP address of the service hosted in the virtual network and for communicating, from the visibility agent to the hosted service metadata collector, notification of a change in the IP address of the service hosted in the virtual network when the service hosted in the virtual network moves from the computing platform to a different computing platform in the virtual network for load balancing, failover, or other operational reasons of the virtual network;

wherein the hosted service metadata collector receives, from the visibility agent, the notification of the change in the IP address associated with the service and communicates, pursuant to a subscription created by the subscription request message, the notification of the change in the IP address; and a firewall policy management interface for receiving, from the hosted service metadata collector, the notification of the change in IP address and automatically configuring the firewall to allow egress traffic from the enterprise network to the service and ingress traffic from the service into the enterprise network.

10. The system of claim 9 wherein the hosted service metadata collector collects metadata for a plurality of different services hosted in the virtual network, wherein the hosted service metadata includes mappings between hosted service identifiers and network addresses associated with the hosted services.

11. The system of claim 9 wherein the hosted service metadata collector is configured to monitor domain name system (DNS) records for the service hosted in the virtual network.

12. The system of claim 9 wherein the hosted service metadata collector is configured to monitor service logs of the virtual network.

13. The system of claim 9 wherein the firewall policy management interface is configured to monitor session traffic associated with the hosted service and to automatically configure the firewall based on utilization of the hosted service.

14. The system of claim 9 wherein the virtual network comprises a cloud network.

15. A non-transitory computer readable medium having stored thereon executable instructions that when executed by a processor of a computer control the computer to perform steps comprising:

receiving, at a hosted service metadata collector and from an automated firewall policy management interface, a subscription request message through which the automated firewall policy management interface subscribes to receive a current Internet protocol (IP) address of a service hosted in a virtual network separate from an enterprise network protected by a firewall and to automatically receive updates when the IP address of the service hosted in the virtual network changes;

monitoring, using a visibility agent separate from the firewall and co-located with the service hosted in a virtual network separate from the enterprise network protected by the firewall, changes in the IP address of the service hosted in the virtual network, wherein the service hosted in the virtual network comprises a service hosted on a computing platform in the virtual network and that provides service to clients located behind the firewall in the enterprise network;

detecting, by the visibility agent, a change in the IP address of the service hosted in the virtual network, when the service hosted in the virtual network moves from the computing platform to a different computing platform in the virtual network for load balancing, failover, or other operational reasons of the virtual network;

communicating, from the visibility agent to the hosted service metadata collector, notification of the change in the IP address and communicating, pursuant to a subscription created by the subscription request message, notification of the change in the IP address from the hosted service metadata collector to the firewall policy management interface; and automatically configuring, by the firewall policy management interface and responsive to receiving the notification of the change in the IP address, the firewall to allow egress traffic from the enterprise network to the service and ingress traffic from the service into the enterprise network.

* * * * *